United States Patent
Shibuno et al.

(10) Patent No.: US 8,085,338 B2
(45) Date of Patent: Dec. 27, 2011

(54) IMAGING APPARATUS AND CAMERA SYSTEM

(75) Inventors: Koji Shibuno, Osaka (JP); Takahiro Ikeda, Osaka (JP); Hiroyuki Kawahara, Osaka (JP); Takashi Abe, Ehime (JP)

(73) Assignee: Panasonic Corporation, Osaka (JP)

( * ) Notice: Subject to any disclaimer, the term of this patent is extended or adjusted under 35 U.S.C. 154(b) by 411 days.

(21) Appl. No.: 12/465,886

(22) Filed: May 14, 2009

(65) Prior Publication Data

US 2009/0284643 A1    Nov. 19, 2009

Related U.S. Application Data

(60) Provisional application No. 61/053,815, filed on May 16, 2008.

(30) Foreign Application Priority Data

Jun. 17, 2008    (JP) .................................. 2008-157757

(51) Int. Cl.
H04N 5/232    (2006.01)

(52) U.S. Cl. ...................................................... 348/345

(58) Field of Classification Search .................. 348/345, 348/347, 349, 370, 363; 396/79, 133
See application file for complete search history.

(56) References Cited

U.S. PATENT DOCUMENTS

| 7,616,258 | B2 * | 11/2009 | Shibata | 348/372 |
| 7,978,967 | B2 * | 7/2011 | Shibuno et al. | 396/79 |
| 2005/0146640 | A1 | 7/2005 | Shibata | |

FOREIGN PATENT DOCUMENTS

| JP | 2003-101853 A | 4/2003 |
| JP | 2004-023476 A | 1/2004 |
| JP | 2005-195893 A | 7/2005 |
| JP | 2008-092619 A | 4/2008 |

* cited by examiner

Primary Examiner — Hung Dang
(74) Attorney, Agent, or Firm — Panasonic Patent Center; Dhiren Odedra; Kerry Culpepper

(57) ABSTRACT

An imaging apparatus includes an optical system including a focus lens, a driver configured to drive the focus lens, a controller configured to control a supply of power to the driver, and a setting unit configured to set a power supply mode for specifying a method of supplying power to the driver. When a predetermined power supply mode is set, the controller determines according to a magnitude of a depth of field of the optical system during whether holding power for holding the state of the focus lens is supplied to the driver when the focus lens is stopped, and controls the supply of the holding power to the driver according to the result of the determination.

10 Claims, 13 Drawing Sheets

Fig. 3A

| CONTROL MODE | MOVING IMAGE SHOOTING MODE OR PLAYBACK MODE | STILL IMAGE SHOOTING MODE |
|---|---|---|
| POWER SUPPLY MODE | POWER-SAVING MODE | NORMAL MODE |

Fig. 3B

| CONTROL MODE | STILL IMAGE SHOOTING MODE | |
|---|---|---|
| (OPERATION STATE) | WAIT FOR HALF-PRESSING | HALF PRESSED (START OF SHOOTING OPERATION) |
| POWER SUPPLY MODE | POWER-SAVING MODE | NORMAL MODE |

Fig. 4

| SETTING INFORMATION | POWER-SAVING MODE | NORMAL MODE |
|---|---|---|
| FOCUS LENS DRIVER | SUPPLY/STOP OF HOLDING POWER | SUPPLY OF HOLDING POWER |

Fig. 5

SWITCHOVER OF ON/OFF OF HOLDING POWER

| | | ZOOM LENS (ZOOM POSITION) | | | | |
|---|---|---|---|---|---|---|
| | TELE ← 1 | 2 | 3 | 4 | 5 | 6 → WIDE |
| OPEN 0 | ON | ON | ON | ON | ON | OFF |
| 1 | ON | ON | ON | ON | OFF | OFF |
| 2 | ON | ON | ON | OFF | OFF | OFF |
| 3 | ON | ON | OFF | OFF | OFF | OFF |
| 4 | ON | OFF | OFF | OFF | OFF | OFF |
| SHUT 5 | OFF | OFF | OFF | OFF | OFF | OFF |

DIAPHRAGM (APERTURE VALUE)
OPEN ←→ SHUT

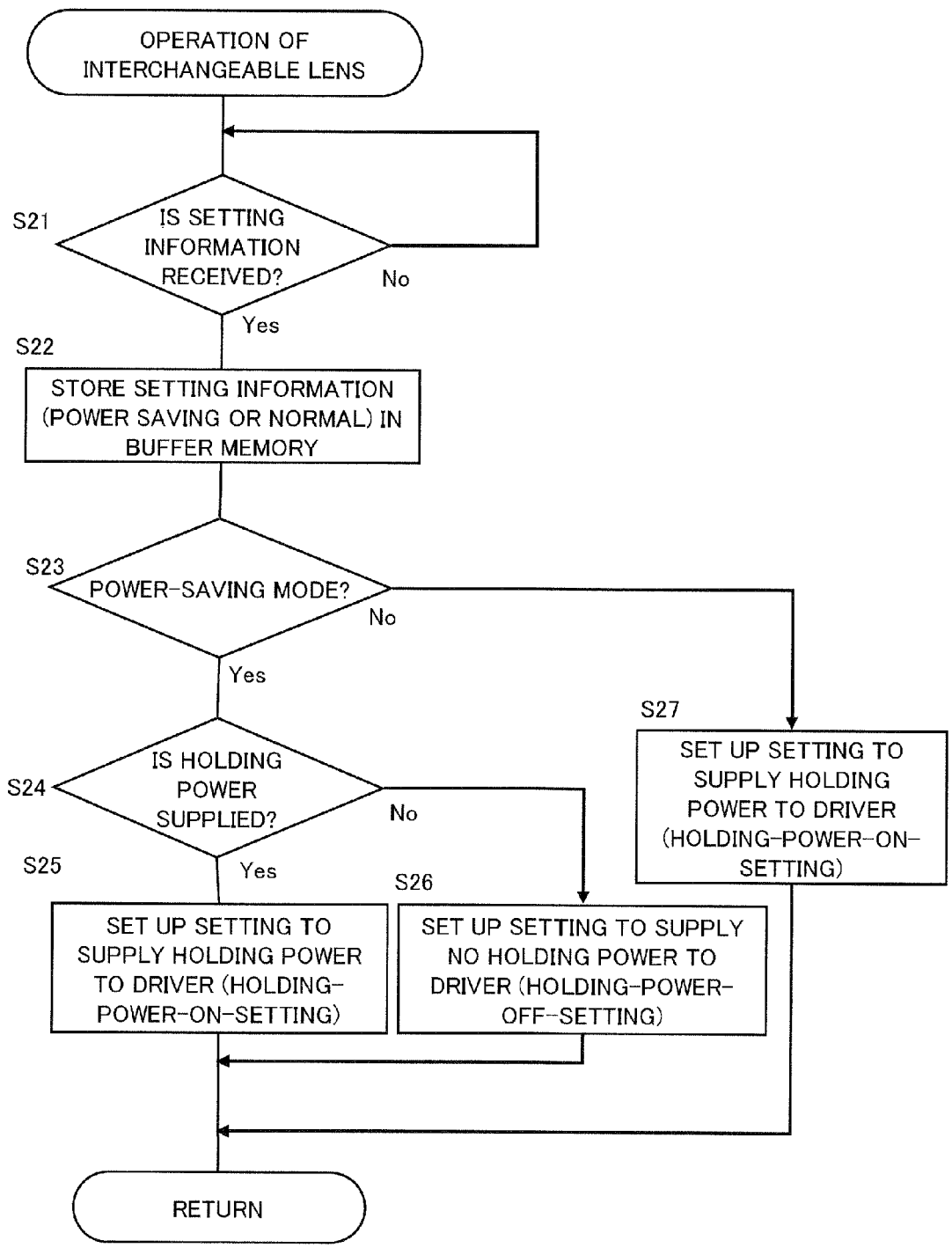

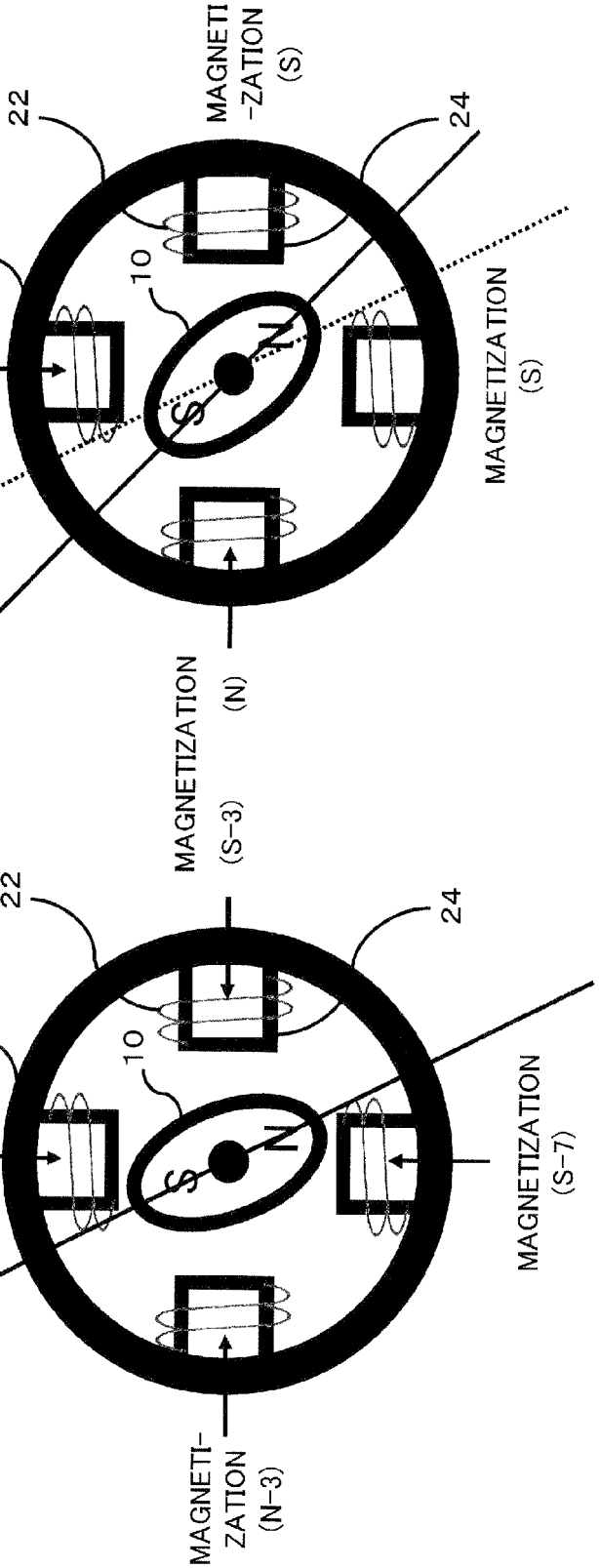

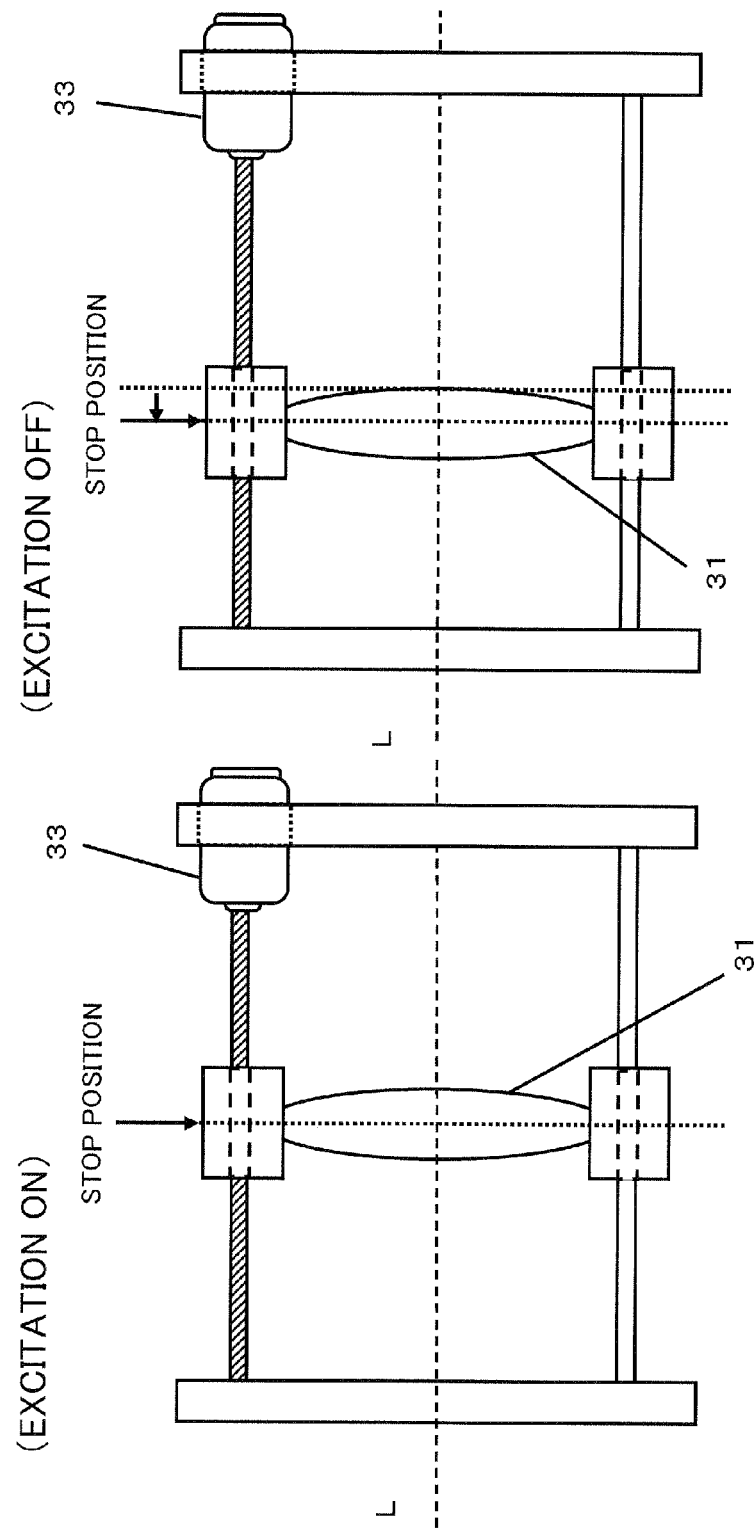

IMAGING APPARATUS AND CAMERA SYSTEM

BACKGROUND

1. Technical Field

The technical field relates to an imaging apparatus, such as a digital still camera or a digital video camera, having drive unit that can drive a focus lens.

2. Related Art

A conventional digital camera includes a motor (actuator) for driving a zoom lens, a focus lens, a diaphragm, or the like (see, for example, JP-A-2008-92619). For the digital camera described above, various proposals are provided, such as improvement of drive noises of the motor, the maximum operation speed, precision at a stop position, power consumption, or the like.

In order to save power consumption of the digital still camera, it can be considered not to supply power to a motor that is not being driven. However, when no power is supplied to a motor mounted in a normal digital camera, the motor cannot allow a rotor to stop at a desired position accurately, so that a lens or the like cannot be controlled at a desired position. This will be detailed below with a stepping motor taken as an example.

FIGS. 12A and 12B are sectional views of a stepping motor. The stepping motor includes a rotor 10 made of a magnet and a stator 20 provided with an electromagnet. The stepping motor rotates the rotor 10 by attraction force caused between the magnet of the rotor 10 and magnetic field which is generated by an electric current flowing through a stator winding 22.

A stepping motor that drives a movable lens with a microstep drive does not turn on and off a conduction of electric current to the stator winding 22 simply, but controls finely the ratio of the electric current flowing through the adjacent two windings, so that the position of the rotor 10 is controlled finely. Therefore, when no current is supplied to the stator winding 22 of the stepping motor, a magnetic field is not produced in the stator winding 22, so that the rotor 10 cannot be maintained at a desired position. For example, if power supply is stopped on the condition that the rotor 10 is located at the desired position by supplying the power to the stator winding 22 (FIG. 12A), the rotor 10 moves and stops at the position shifted from the desired position (FIG. 12B). This operation will specifically be described below. The electromagnet portion 24 that generates a magnetic field by supplying a current to the windings of the stator 22 is magnetized by the magnetic force of the rotor 10 when the supply of the current to the stator winding 22 is stopped. Therefore, attraction force is generated between the electromagnet portion 24 and the rotor (magnet) 10 so that the rotor 10 moves to a specific position (stable point). Specifically, as shown in FIG. 12A, the adjacent electromagnet portions 24 that are magnetized with a predetermined ratio are uniformly magnetized by the magnetic force of the magnet of the rotor 10 when the supply of the current to the stator winding 22 is stopped. Accordingly, the rotor 10 stops at the middle position between the adjacent electromagnet portions 24 as shown in FIG. 12B. This stop position is the stable point.

FIGS. 13A and 13B are views showing the configuration of a driver that drives a focus lens by the stepping motor. As shown in FIG. 13A, when the power is supplied to the stepping motor 33 that drives the focus lens 31 (when excitation ON), the focus lens 31 is stopped at a desired stop position. On the other hand, when no power is supplied to the stepping motor 33 (when excitation OFF), the focus lens 31 is stopped at a position shifted from the desired stop position as shown in FIG. 13B. Accordingly, for the motor described above, precision in a stop position of the lens is degraded when no power is supplied to the motor.

SUMMARY

In a general compact-type digital camera, the high precision for a stop position of a focus lens is required during still image shooting, and therefore the excitation is turned ON. On the other hand, in the cases other than the shooting of a still image, precision for the stop position of the focus lens is not so required, and thus the excitation is turned OFF. As described above, in a compact digital camera, the supply of power to a drive member is stopped when the precision for the stop position of the focus lens is unnecessary, resulting in power saving.

However, even in such a digital camera, high precision for the stop position of the focus lens may be required during moving image shooting. For example, it may be required when the depth of field is shallow when, for example, the zoom lens is driven to a telephoto side and a diaphragm is driven to an open side. In this case, when the precision for the stop position of the focus lens is poor, a subject is not in focus and an out-of-focus moving image might be captured.

Further, in the cases other than the shooting of a moving image, there may be the case in which high precision for the stop position of the focus lens is required. For example, it is the case (in live view mode) in which the digital camera displays an image of data generated by an imaging device on a liquid crystal monitor as a through-the-lens image. In this case, an out-of-focus moving image might also be captured and thus an out-of-focus through image might be displayed, similarly.

Further in a digital camera system including an interchangeable lens and a camera body, the problem described above may be likely to occur because the depth of field can be made shallower in the interchangeable lens than that in a compact-type digital camera.

In order to solve the above-mentioned problem, an imaging apparatus is provided that can reduce power consumption of the imaging apparatus and precisely hold a focused state of a subject as required.

In a first aspect of the present invention, an imaging apparatus including the following configuration is provided. The imaging apparatus includes an optical system including a focus lens; a driver configured to drive the focus lens; a controller configured to control a supply of power to the driver; and a setting unit configured to set a power supply mode for specifying a method of supplying power to the driver. When a predetermined power supply mode is set, the controller determines according to a magnitude of a depth of field of the optical system during whether holding power for holding the state of the focus lens is supplied to the driver when the focus lens is stopped, and controls the supply of the holding power to the driver according to the result of the determination.

According to this configuration, when the imaging apparatus allows the focus lens to stop and stand by in case where the imaging apparatus is set to a predetermined mode, e.g., a power-saving mode, it can be controlled such that a holding power is to be supplied or not to the drive means according to the depth of field.

In a second aspect, a camera system including an interchangeable lens and a camera body. The camera body includes a power supplying unit configured to supply power to the interchangeable lens; a setting unit configured to set a power supply mode for specifying a method of supplying power; and a sending unit configured to send setting information indicating the set power supply mode to the interchangeable lens. The interchangeable lens includes an optical system including a focus lens; a driver configured to drive the focus lens with the power received from the power supplying unit; and a controller configured to control a supply of power to the driver. When a predetermined power supply mode is set according to the setting information from the camera body, the controller determines according to a magnitude of a depth of field of the optical system whether holding power for holding the state of the focus lens is supplied to the driver when the focus lens is stopped, and controls the supply of the holding power to the driver according to the result of the determination.

In a third aspect, an interchangeable lens mountable to a camera body includes: an optical system including a focus lens; a driver configured to drive the focus lens with power received from the camera body; a controller configured to control a supply of power to the driver; and a setting unit configured to set a power supply mode for specifying a method of supplying power to the driver under the control of the camera body. When a predetermined power supply mode is set according to setting information from the camera body, the controller determines according to a magnitude of a depth of field of the optical system whether holding power for holding the state of the focus lens is supplied to the driver when the focus lens is stopped, and controls the supply of the holding power to the driver according to the result of the determination.

The imaging apparatus in the above described aspects determines whether the holding power should be supplied to the driver according to the information relating to the depth of field of the optical system, and then supplies the holding power to the drive unit, with the imaging apparatus set to a predetermined mode in which the focus lens is stopped and stands by. This configuration allows power consumption in the imaging apparatus to be reduced, and further the focused state to a subject to be held precisely as needed.

BRIEF DESCRIPTION OF THE DRAWINGS

FIG. 3A is a diagram for explaining setting information sent according to a control mode or a control state of a camera body according to the first embodiment.

FIG. 3B is a diagram for explaining power setting that is set according to the control state of a camera system.

FIG. 4 is a diagram for explaining determination as to whether holding power should be supplied to a focus driver according to the setting information acquired by an interchangeable lens in the first embodiment.

FIG. 5 is a diagram for explaining determination as to whether holding power should be supplied to a focus driver according to the information relating to the depth of field in an embodiment.

FIG. 7 is a flowchart for explaining an example of an operation of the interchangeable lens in the embodiment.

FIG. 12A is a view for explaining an internal condition of a stepping motor to which holding power is supplied, and FIG. 12B is a view for explaining an internal condition of a stepping motor to which no holding power is supplied.

FIG. 13A is a view for explaining a stop position of a focus lens when holding power is supplied to the stepping motor, and FIG. 13B is a view for explaining the stop position of the focus lens when no holding power is supplied to the stepping motor.

DETAIL DESCRIPTION OF THE PREFERRED EMBODIMENTS

Embodiments will be described below with reference to the drawings.

First Embodiment

1. Structure
1-1. Outline of Overall Structure

Figure 1:
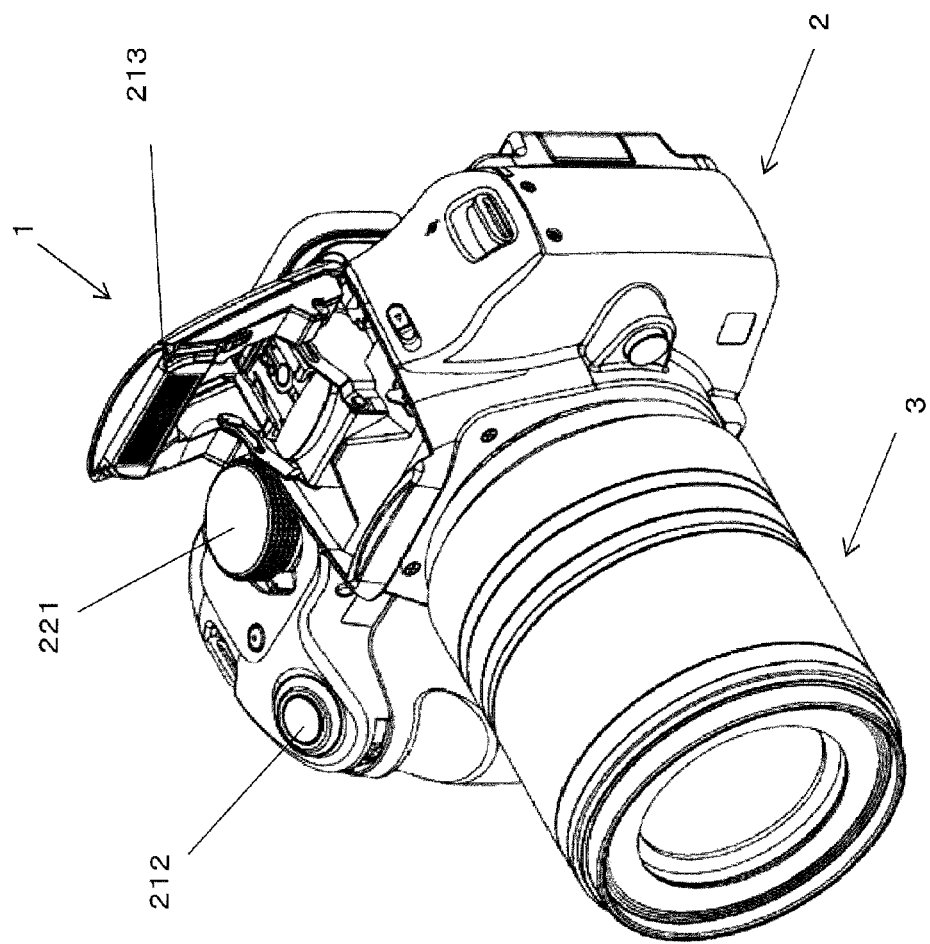
FIG. 1 is a perspective view of a digital camera according to a first embodiment.
Figure 2:
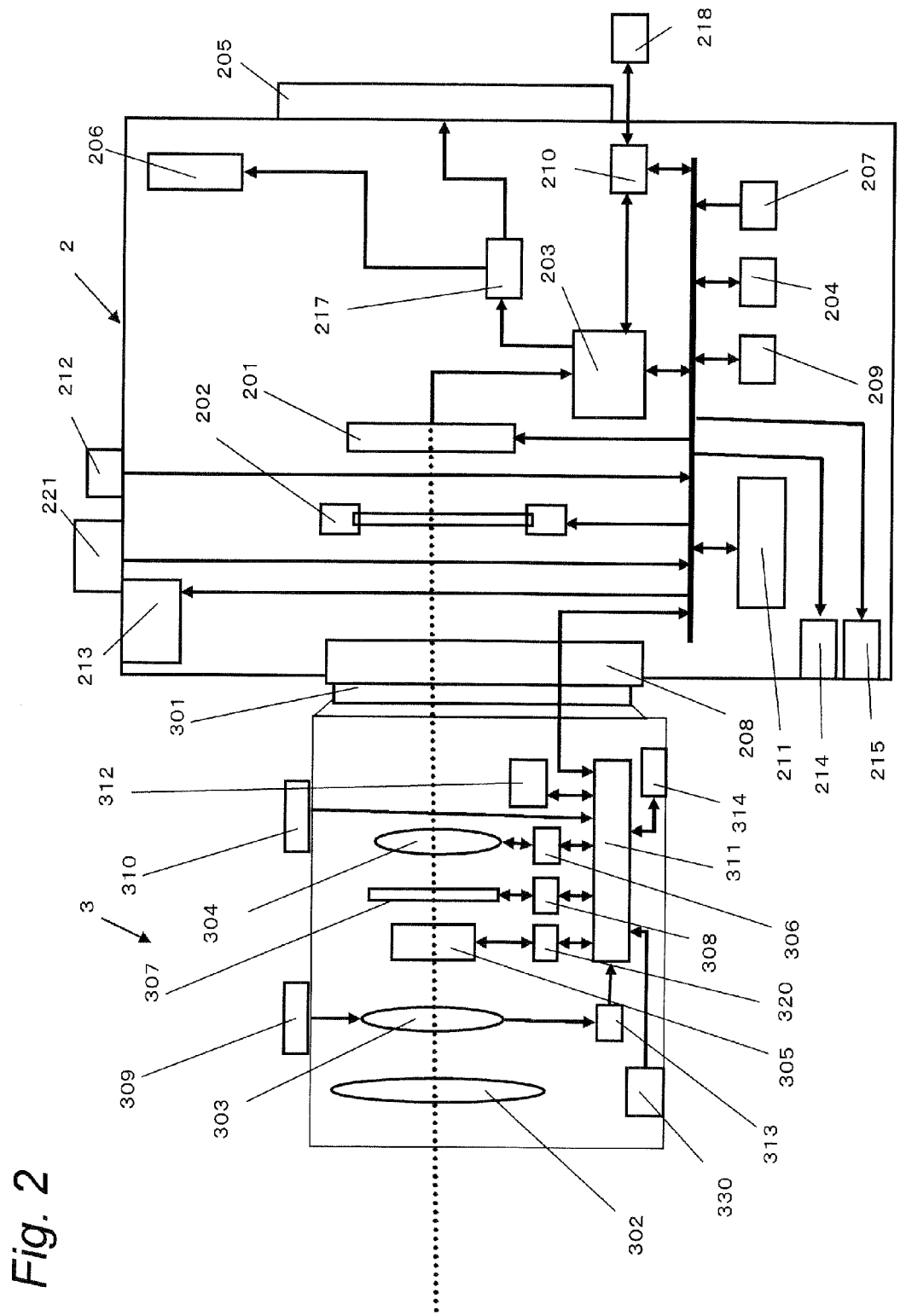
FIG. 2 is a block diagram showing an example of a configuration of the digital camera according to the first embodiment.

FIG. 1 is a perspective view of a digital camera according to an embodiment. FIG. 2 is a diagram showing a hardware configuration of the digital camera according to the embodiment.

The digital camera 1 according to the present embodiment includes a camera body 2 and an interchangeable lens 3 that is mountable to the camera body 2.

The camera body 2 includes a CMOS sensor 201, a mechanical shutter 202, a signal processing processor (DSP) 203, a buffer memory 204, a liquid crystal monitor 205, an electronic viewfinder (EVF) 206, a power source 207, a body mount 208, a flash memory 209, a card slot 210, a CPU 211, a shutter switch 212, an electronic flash 213, a microphone 214, and a speaker 215.

The interchangeable lens 3 includes a lens mount 301, an optical system including a zoom lens 303, a focus lens 304, and an OIS lens 305, a focus driver 306 that drives the focus lens 304, an OIS driver 320 that drives the OIS lens 305, a diaphragm 307, an diaphragm driver 308 that drives the diaphragm 307, a zoom ring 309, a focus ring 310, a lens controller 311, a buffer memory 312, a zoom lens position detector 313, a flash memory 314, and a gyro sensor 330.

1-2. Configuration of Camera Body

The camera body 2 is configured to capture a subject image collected by the optical system of the interchangeable lens 3 and record the captured image data in a recording medium.

The CMOS sensor 201 includes a light-receiving element, an AGC (gain control amplifier), and an AD converter. The light-receiving element converts an optical signal collected by the optical system to an electric signal to generate image data. The AGC amplifies the electric signal outputted from the CMOS sensor 201. The AD converter converts the electric signal outputted from the CMOS sensor 201 to a digital signal. The CMOS sensor 201 performs various operations, such as an exposure, transfer, electronic shutter, or the like, according to a control signal received from the CPU 211. These various operations can be realized by a timing generator or the like.

The mechanical shutter 202 switches transmission and cut-off of the optical signal input to the CMOS sensor 201 through the optical system. The mechanical shutter 202 is driven by a mechanical shutter driver. The mechanical shutter driver includes components such as a motor, spring, or the like. The mechanical shutter driver drives the mechanical shutter 202 under the control of the CPU 211. Specifically, the mechanical shutter 202 opens or closes to temporarily adjust amount of light reaching the CMOS sensor 201.

The signal processing processor (DSP) 203 performs a predetermined image process to the image data that is converted to the digital signal by the AD converter. The predetermined image process includes, for example, a gamma conversion, YC conversion, electronic zoom process, compression process, extension process, or the like, but the image process is not limited thereto.

The buffer memory 204 serves as a work memory when the signal processing processor 203 performs a process or when the CPU 211 performs the control process. The buffer memory 204 can be realized by a DRAM, for example.

The liquid crystal monitor 205 is disposed at the backside of the camera body 2 and can display the image data generated by the CMOS sensor 201 or image data obtained by a predetermined process to the image data. The image signal inputted into the liquid crystal monitor 205 is converted to an analog signal from the digital signal by a DA converter, when the image signal is outputted to the liquid crystal monitor 205 from the signal processing processor 203.

The electronic viewfinder 206 is disposed within the camera body 2, and can display the image data generated by the CMOS sensor 201 or image data obtained by applying a predetermined process to the image data. An image signal inputted to the electronic viewfinder 206 is similarly converted to an analog signal from the digital signal by the DA converter, when the image signal is outputted to the electronic viewfinder 206 from the signal processing processor 203.

To display an image, the liquid crystal monitor 205 and the electronic viewfinder 206 are switched by a display switching unit 217. Specifically, while an image is displayed on the liquid crystal monitor 205, no image is displayed on the electronic viewfinder 206. While an image is displayed on the electronic viewfinder 206, no image is displayed on the liquid crystal monitor 205. The display switching unit 217 can be realized by a physical structure such as a selection switch. For example, when the signal processing processor 203 and the liquid crystal monitor 205 are electrically connected to each other, the electrical connection between the signal processing processor 203 and the liquid crystal monitor 205 is disconnected so that the signal processing processor 203 and the electronic viewfinder 206 are electrically connected through the switch of the changeover switch. The display switching unit 217 is not limited to the above-mentioned structure. The display switching unit 217 may change the display on the liquid crystal monitor 205 and the display on the electronic viewfinder 206 based on the control signal from the CPU 211.

As described above, the display on the liquid crystal monitor and the display on the electronic viewfinder are switched. It is to be noted that this switching is done because of the structural limitation. Therefore, display may be provided on the liquid crystal monitor and the electronic viewfinder simultaneously. When an image is simultaneously displayed, the image displayed on the liquid crystal monitor and the image displayed on the electronic viewfinder may be the same or may be different.

The power source 207 supplies power consumed by the digital camera 1. The power source 207 may be a dry battery or a rechargeable battery. Further, the power source 207 may supply power, which is externally supplied through a cord, to the digital camera 1.

The body mount 208 cooperating with the lens mount 301 of the interchangeable lens 3 is a member that enables attachment/detachment to/from the interchangeable lens 3. The body mount 208 can be electrically connected to the interchangeable lens 3 by means of a connection terminal or the like. Further, the body mount 208 can be mechanically connected by means of a mechanical member such as a engaging member. The body mount 208 can output a signal from the lens controller 311 in the interchangeable lens 3 to the CPU 211, and can output a signal from the CPU 211 to the lens controller 311 of the interchangeable lens 3. Specifically, the CPU 211 can send and receive the control signal or information relating to optical system to and from the lens controller 311 in the interchangeable lens 3. The body mount 208 further supplies power which is supplied from the power source 207 to the lens controller 311. In this manner, the body mount 208 supplies power consumed in the interchangeable lens 3.

The flash memory 209 is a storage medium used as an internal memory. The flash memory 209 can store image data or image data obtained by performing a predetermined process to original image data. The flash memory 209 can also store a digitalized voice signal. The flash memory 209 can also store a program or a setting value for the control of the CPU 211 in addition to the image data or the voice signal.

The card slot 210 is a slot through which a memory card 218 serving as a storage medium is detachably inserted. The memory card 218 can store image data or image data obtained by performing a predetermined process to original image data. The memory card 218 can also store a digitalized voice signal.

The CPU 211 controls the overall of the camera body 2. The CPU 211 may be realized by a microcomputer or a hard-wired circuit. Specifically, the CPU 211 performs various controls. The various controls will be described in detail in Section 2-1.

The shutter switch 212 is a button provided on the top surface of the camera body 2 and detects a half-press or a full-press operations by a user. When the shutter switch 212 detects the half-press operation by a user, the shutter switch 212 outputs a half-press signal to the CPU 211. On the other hand, when the shutter switch 212 detects the full-press operation by the user, the shutter switch 212 outputs a full-press signal to the CPU 211. The CPU 211 performs various controls based on these signals. In the present embodiment, the full-press signal means a shooting start signal.

The electronic flash 213 irradiates a subject with light based on the control signal from the CPU 211. For example, the electronic flash 213 can be composed of a xenon lamp and a capacitor and others. When the electronic flash 213 is configured as described above, the electronic flash 213 accumulates high-voltage charges into the capacitor and applies these charges to an electrode of the xenon lamp, whereby it radiates light.

The microphone 214 converts voice into an electric signal. The electric signal outputted from the microphone 214 is converted to a digital signal by the AD converter. The digital signal converted by the AD converter is stored in the flash memory 209 or the memory card 218 under the control of the CPU 211.

The speaker 215 converts an electric signal into voice. The electric signal inputted to the speaker 215 is a signal converted by the DA converter from the digital signal to the electric signal. The digital signal read out from the flash memory 209 or the memory card 218 is outputted to the DA converter under the control of the CPU 211.

A mode switching dial 221 is an operation member mounted at the outside of the camera body 2. The mode switching dial 221 is configured into a substantially circular shape. The mode switching dial 221 can select one control mode among a plurality of control modes through a turning operation by a user. Specifically, the mode switching dial 221 can detect the control mode, which is moved to a predetermined position, so as to select one of the plurality of control modes. The plurality of control modes include, for example, a "still image shooting mode", a "moving image shooting mode", and a "playback mode". When an indication showing the "still image shooting mode" provided on the top surface of the mode switching dial is moved to a predetermined position (selection position), the mode switching dial 221 outputs a mode switching signal which indicates that the mode is changed to the "still image shooting mode", to the CPU 211. Thus, the changeover of the control mode can be detected.

1-3. Configuration of Interchangeable Lens

The optical system includes the zoom lens 303, the focus lens 304, the OIS lens 305, and an objective lens 302, collecting light from a subject. The zoom lens 303 is driven by the zoom ring 309 so as to adjust a zoom magnification. The focus lens 304 is driven by the focus driver 306 or the focus ring 310 so as to adjust a focus. The OIS lens 305 is driven by an OIS driver 320. The focus lens 304, the zoom lens 303, and the OIS lens 305 are movable lenses.

The OIS lens 305 is movable in a plane vertical to an optical axis of the optical system. The optical axis of the optical system can be bent through the movement of the OIS lens 305 in the plane vertical to the optical axis of the optical system. When the OIS lens 305 is moved in the direction in which a shake of the digital camera 1 detected by the later-described OIS driver 320 is canceled, an image blur caused by the shake of the digital camera 1 can be prevented.

The focus driver 306 drives the focus lens 304 under the control of the lens controller 311. The present embodiment illustrates that the focus driver 306 is realized by a stepping motor and a driver. The focus driver 306 is configured such that power is supplied from the lens controller 311 so as to drive the focus lens 304. When power is supplied from the lens controller 311, the focus driver 306 stops the focus lens 304 at a desired position. On the contrary, when power is not supplied from the lens controller 311, the focus driver 306 stops the focus lens 304 at a position with precision lower than that at the desired position. In summary, the focus driver 306 stops the focus lens 304 at the different positions for holding the focus lens 304 where the precisions are different between the case in which power is supplied from the lens controller 311 and the case in which no power is supplied from the lens controller 311. When power is supplied, the focus driver 306 can stop the focus lens 304 at the desired position more precisely (with higher precision) compared to the case in which no power is supplied.

The focus driver 306 stops the focus lens 304 at a desired position when power is supplied. However, it is unnecessary to stop the focus lens 304 at an exact position. Specifically, the focus driver 306 may stop the focus lens 304 with precision higher than the precision at the position where the focus lens 304 is stopped when no power is supplied from the lens controller 311.

The OIS driver 320 drives the OIS lens 305 under the control of the lens controller 311 based on the output from the gyro sensor 330. An optical image blur correction function can be realized by the gyro sensor 330, the lens controller 311, the OIS driver 320 and the OIS lens 305. The gyro sensor 330 detects a moving angular speed of the digital camera 1. The lens controller 311 integrates the angular speed detected by the OIS driver 320 so as to calculate the angular speed of the digital camera 1. This results in shake amount of the digital camera 1. The lens controller 311 gives an instruction to the OIS driver 320 for driving the OIS lens 305 so that the movement of the digital camera 1 is cancelled and a subject image does not move on the CMOS sensor 201 as much as possible. The OIS driver 320 drives the OIS lens 305 according to this instruction. As described above, the OIS lens 305 moves in the vertical plane of the optical axis of the optical system to bend the optical axis of the optical system. This allows motion of the subject image on the CMOS sensor 201 to be suppressed as much as possible.

The diaphragm 307 regulates quantity of light passing through the optical system. For example, light can be regulated by increasing or decreasing an opening made by five blades.

The diaphragm driver 308 changes the size of the opening of the diaphragm 307. In the first embodiment, the diaphragm driver 308 changes the size of the opening of the diaphragm 307 under the control of the lens controller 311. The size of the opening can be designated by an F value. The diaphragm driver 308 drives the diaphragm 307 under the control of the lens controller 311, but it is not limited thereto. The diaphragm driver 308 may drive the diaphragm 307 with a mechanical method.

The diaphragm driver 308 includes an encoder that detects the size (position) of the opening of the diaphragm and outputs the result as an AV (Aperture Value) (information relating to brightness). The diaphragm driver 308 outputs the AV to the lens controller 311. The AV outputted from the diaphragm driver 308 ranges AV0 to AV5, for example.

The zoom ring 309 is provided at the outside of the interchangeable lens 3 for driving the zoom lens 303 according to the operation by a user. The zoom ring 309 mechanically drives the zoom lens 303, when turned by the user.

The focus ring 310 is provided at the outside of the interchangeable lens 3 for driving the focus lens 304 according to the operation by a user. When turned by a user, the focus ring 310 detects the user's operation with a sliding resistance to output a signal relating to the operation to the lens controller 311. The lens controller 311 controls the focus driver 306 according to the signal relating to the inputted operation. Thus, the focus driver 306 drives the focus lens 304.

The lens controller 311 controls the entire interchangeable lens 3. The lens controller 311 may be realized by a microcomputer or by a hard-wired circuit. Specifically, the lens controller 311 performs various controls. The various controls by the lens controller 311 will be described in Section 2-2.

The buffer memory 312 functions as a work memory, when the lens controller 311 performs control processes. The buffer memory 312 can be realized by a DRAM, for example.

The flash memory 314 is electrically connected to the lens controller 311. The flash memory 314 can store a control program, a parameter or the like.

The zoom lens position detector 313 acquires information relating to the zoom position of the zoom lens 303. Specifically, the zoom position indicates the position of the zoom lens 303 designated for every region, which is formed by dividing the movable range of the zoom lens 303 in plural regions. The lens controller 311 periodically acquires the information relating to the zoom position detected by the zoom lens position detector 313.

The zoom lens position detector 313 is composed of a sliding resistance and others. The zoom lens position detector 313 detects the information relating to the zoom position of the zoom lens 303 in terms of a voltage value. Since the lens controller 311 periodically reads the voltage value detected by the zoom lens position detector 313 and performs AD-conversion to the voltage value to acquire the information (digitalized data) relating to the zoom position divided into 256. It is noted in the present embodiment, the information relating to the zoom position divided into 6 is used for simplifying the description.

1-4. Correspondence of Terms

The digital camera 1 is one example of an imaging apparatus or a camera system. The focus driver 306 is one example of a drive unit. The CPU 211 and the lens controller 311 are one examples of a setting unit and a controller. The power source 207 is one example of a supplying unit. The combination of the CPU 211 and the body mount 208 is one example of a sending unit.

2. Control of Camera Body and Interchangeable Lens

The control of the camera system thus configured will be described below in detail.

2-1. Control of CPU in Camera Body

The camera system 1 in the present embodiment can be set to a moving image shooting mode for shooting a moving image, a still image shooting mode for shooting a still image, and a playback mode for reproducing an image, as a control mode. Power setting modes set to the interchangeable lens 3 include a normal mode, and a power-saving mode for reducing power consumption more than in the normal mode. FIG. 3A shows the relationship between the control modes set to the camera body 2 and the power setting in the respective control modes. In the normal mode, even if the focus lens 304 is not driven, the supply of the power to the focus driver 306 is continued. On the other hand, in the power-saving mode, when the focus driver 304 is not driven, the supply of the power to the focus driver 306 is stopped so that the power is saved.

The CPU 211 in the camera body 2 determines whether it is necessary to set the interchangeable lens 3 to the power-saving mode according to the control mode set to the camera body 2, based on the relationship shown in FIG. 3A. For example, when the CPU 211 determines that it is necessary to set the interchangeable lens 3 to the power-saving mode, the CPU 211 sends control information for controlling the interchangeable lens 3 to the power-saving mode to the interchangeable lens 3.

The control mode is selected by a user by means of the mode switching dial 221. When the mode selected by the mode switching dial 221 is the moving image shooting mode or the playback mode, the CPU 211 determines that it is necessary to set the interchangeable lens 3 to the power-saving mode. This is because the moving image shooting mode or the playback mode does not require the precision of the position where the focus lens is stopped, compared to the still image shooting mode. On the other hand, when the mode selected by the mode switching dial 221 is the still image shooting mode, the CPU 211 determines that it is necessary to set the interchangeable lens 3 to the normal mode.

The CPU 211 sends setting information which indicates whether the interchangeable lens 3 needs to be set to the power-saving mode, to the lens controller 311 as described above. Specifically, the CPU 211 sends setting information indicating the power-saving mode to the lens controller 311, when it determines that it is necessary to set the interchangeable lens 3 to the power-saving mode. On the other hand, when the CPU 211 determines that it is unnecessary to set the interchangeable lens 3 to the power-saving mode, it sends setting information indicating the normal mode to the lens controller 311. The lens controller 311 performs a power control according to the setting information.

2-2. Control of Lens Controller in Interchangeable Lens

In the interchangeable lens 3, the lens controller 311 receives the setting information indicating the power-saving mode or the normal mode from the CPU 211. The lens controller 311 sets the interchangeable lens 3 to the power-saving mode or the normal mode according to the received setting information.

The lens controller 311 also determines whether power for holding the position of the focus lens 304 (hereinafter referred to as "holding power") is supplied to the focus driver 306 according to the power setting (normal mode) as shown in FIG. 4.

Specifically, when the normal mode is set, the lens controller 311 supplies the holding power for holding the position of the focus lens 304 to the focus driver 306. On the other hand, when the power-saving mode is set, the lens controller 311 determines according to the depth of field of the optical system whether the holding power is supplied to the focus driver 306 in order to hold the focus lens 304 at the position where it is stopped.

When the lens controller 311 determines that it supplies the holding power to the focus driver 306, the lens controller 311 supplies the holding power to stop the focus lens 304 and hold it at the stop position, to the focus driver 306. In this case, the lens controller 311 supplies the power supplied from the body mount 208 to the focus driver 306 as the holding power.

The control of the lens controller 311 will specifically be described. When the lens controller 311 receives setting information indicating the power-saving mode or the normal mode from the CPU 211 in the camera body 2, it stores the setting information in the buffer memory 312. The lens controller 311 sets the interchangeable lens 3 to the power-saving mode or to the normal mode according to the received setting information.

When the setting information stored in the buffer memory 312 indicates the normal mode, the lens controller 311 supplies the holding power to the focus driver 306. On the other hand, when the setting information stored in the buffer memory 312 indicates the power-saving mode, the lens controller 311 determines the supply/stop of the holding power, taking the depth of field of the optical system into consideration. When the depth of field is deep, less influence is given to the focus state even if the stop position of the focus lens 304 is somewhat shifted due to the non-supply of the holding power, so that there is no influence on an image quality. However, when the depth of field is shallow, the focus state is broken soon after the stop position of the focus lens 304 is shifted due to the non-supply of the holding power, with the result that the image quality is deteriorated. As described above, when the depth of field is deep, there is no problem even when the holding power is not supplied. However when the depth of field is shallow, the image quality might be deteriorated if the holding power is not supplied. In view of this, whether the holding power is supplied or stopped is determined considering the depth of field, in the present embodiment.

Specifically, the lens controller 311 acquires, as information relating to the depth of field of the optical system, information relating to the zoom position of the zoom lens 303 and AV (aperture value) of the diaphragm 307. The information relating to the zoom position can be acquired based on the information outputted from the zoom lens position detector 313. The AV can be acquired based on the information outputted from the diaphragm driver 308. The depth of field is obtained according to the zoom position of the zoom lens 303 and the AV of the diaphragm 307. Whether the holding power is supplied (ON) or stopped (OFF) is determined for the obtained depth of field. FIG. 5 shows table information indicating the relationship among the zoom position of the zoom lens 303 and the AV of the diaphragm 307, and the supply (ON)/stop (OFF) of the holding power.

The lens controller 311 refers to the table information shown in FIG. 5 and determines whether the holding power is supplied or not to the focus driver 306 based on the acquired information. For example, when the zoom position is "3" and the AV is "2" (when the depth of field is shallow), the lens controller 311 determines that the excitation becomes "ON" and the holding power is supplied to the focus driver 306.

When the lens controller 311 determines that the holding power is supplied to the focus driver 306, it supplies the holding power to the focus lens 304 when it allows the focus lens 304 to stand by at the stop position. On the other hand, when the lens controller 311 determines that the holding power is not supplied to the focus driver 306, it does not supply the holding power to the focus lens 304 when it allows the focus lens 304 to stand by at the stop position. The case in which the holding power is not supplied to the focus lens 304 means that the continuous supply of the holding power is stopped. That is, the lens controller 311 may supply temporal holding power during the period when the focus lens 304 is in its stand-by state after it is stopped.

3. Operation

The operation of the digital camera 1 thus configured will be described with reference to the flowcharts shown in FIGS. 6 to 9. In the description below, it is supposed that the interchangeable lens 3 is attached to the camera body 2. When the power is turned ON, the camera body 2 starts the operation described below.

Figure 6:
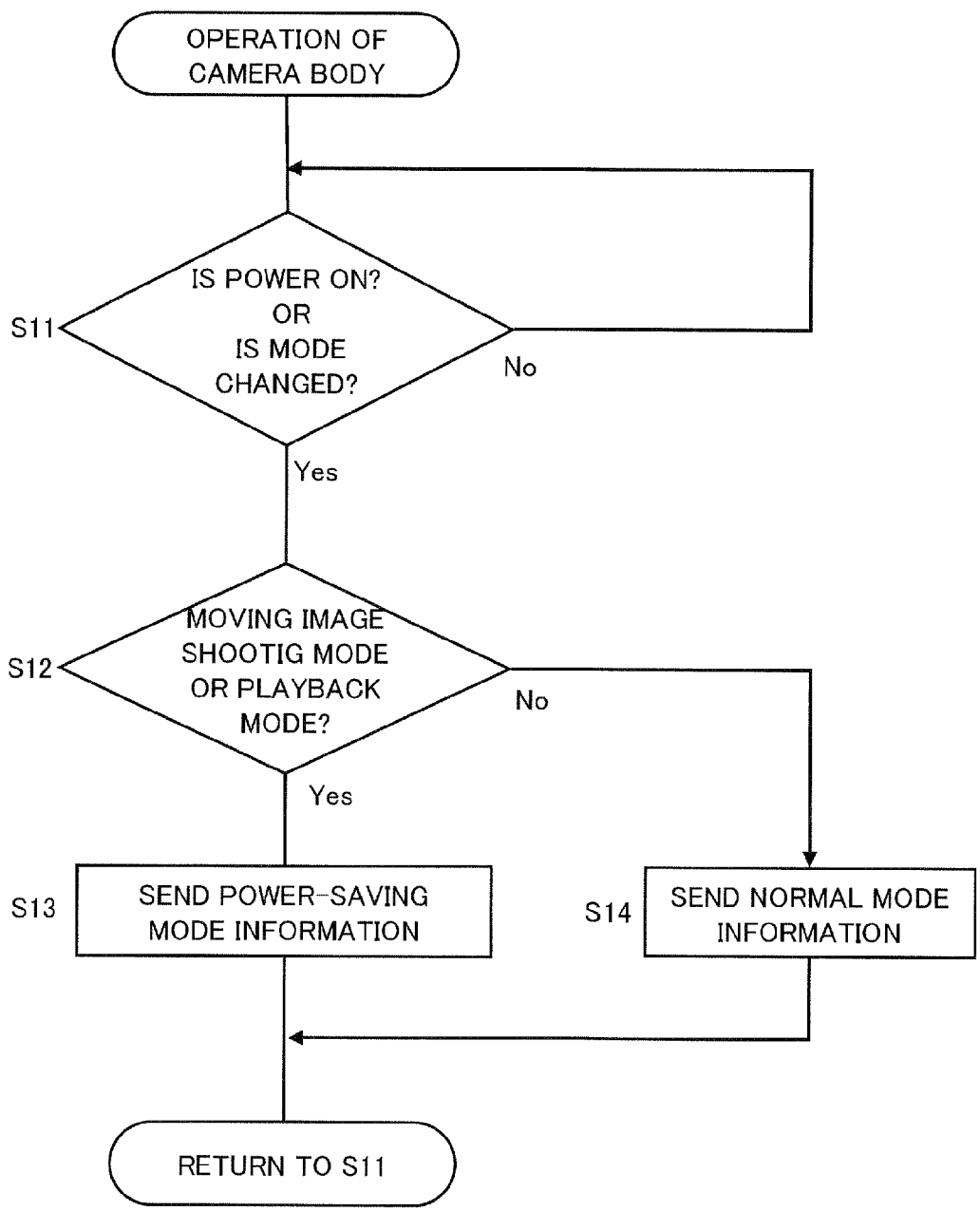
FIG. 6 is a flowchart for explaining an example of an operation of the camera body in the embodiment.

The operation of the camera body 2 will firstly be described with reference to the flowchart shown in FIG. 6.

When the power of the camera body 2 is turned ON or the control mode is changed (S11), the CPU 211 determines whether or not the control mode is set to the moving image shooting mode or the playback mode (S12). When the power of the camera body 2 is turned ON, the CPU 211 detects the control mode selected by the mode switching dial 221. Then, the CPU 211 stores information relating to the control mode detected by the mode switching dial 221 in the buffer memory 204. Thus, the CPU 211 can control components of the camera body 2 according to the stored information relating to the control mode.

Returning to FIG. 6, when the CPU 211 determines in step S12 that the control mode is set to the moving image shooting mode or the playback mode, it sends the setting information indicating the power-saving mode to the lens controller 311 (S13). On the other hand, when determining at step S12 that neither the moving image shooting mode nor the playback mode is set, the CPU 211 sends the setting information indicating the normal mode to the lens controller 311 (S14).

After that, when the control mode is changed through the mode switching dial 221, the process described above is repeated.

Next, the operation of the interchangeable lens 3 will be described with reference to the flowcharts shown in FIGS. 7 and 8. The lens controller 311 determines whether the setting information indicating the power-saving mode or the normal mode is acquired (S21).

When receiving the setting information, the lens controller 311 allows the buffer memory 312 to store the setting information (S22). Thereafter, the lens controller 311 determines whether the received setting information indicates the power-saving mode (S23).

When the received setting information indicates the power-saving mode, the lens controller 311 determines according to the information relating to the depth of field of the optical system whether the holding power is supplied to the focus driver 306 (S24). The specific method for this determination is as described previously with reference to the table in FIG. 5. When determining that the holding power is supplied, the lens controller 311 sets up a setting for operation to supply the holding power to the focus driver 306 after the focus lens 304 is driven (hereinafter referred to as "holding-power-ON-setting") (S25). On the other hand, when determining that the holding power is not supplied, the lens controller 311 sets up a setting for operation to supply no holding power to the focus driver 306 after the focus lens 304 is driven (hereinafter referred to as "holding-power-OFF-setting") (S26).

On the other hand, when the received setting information indicates the normal mode at step S23, the lens controller 311 sets up a setting for operation to supply the holding power to the focus driver 306 after the focus lens 304 is driven (holding-power-ON-setting)(S27).

Figure 8A:
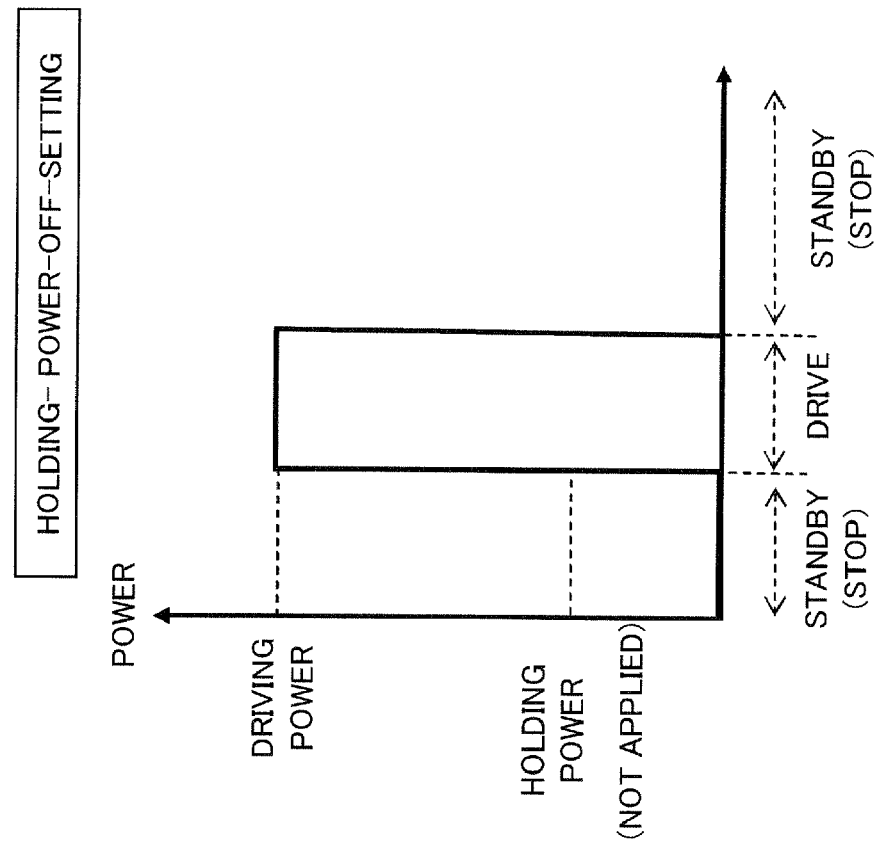
FIG. 8A is a diagram for explaining a supply of power to the focus lens driver during holding-power-ON-setting.
Figure 8B:
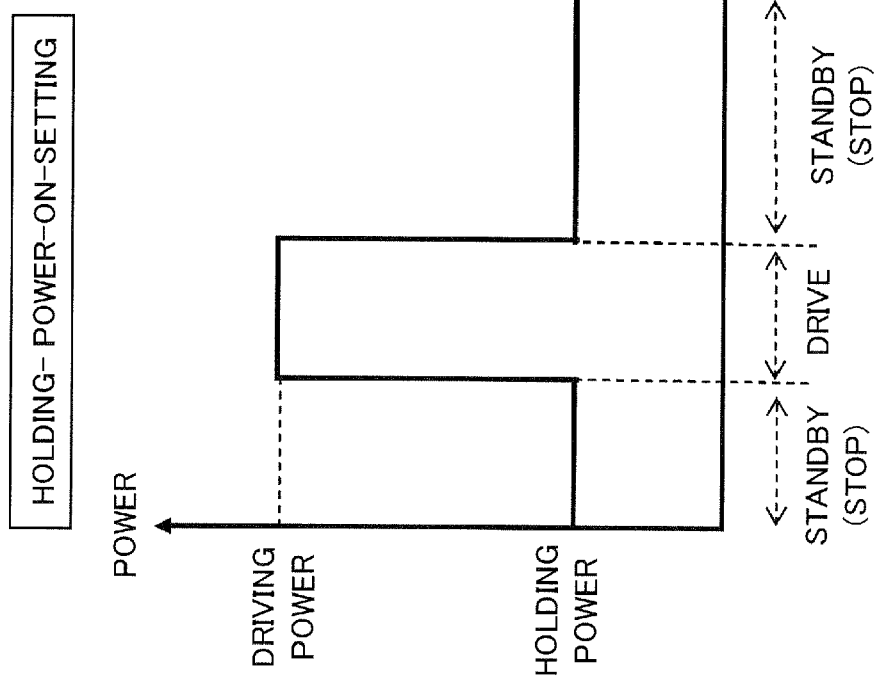
FIG. 8B is a diagram for explaining a supply of power to the focus lens driver during holding-power-OFF-setting.

FIGS. 8A and 8B are diagrams for explaining the power supplied to the focus driver 306 when the holding-power-ON-setting and the holding-power-OFF-setting are performed. When the holding-power-ON-setting is set, the holding power is being supplied to the focus driver 306 not only while the focus lens 304 is driven but also while the focus lens 304 stands by at the stop position after the focus lens 304 is driven, as shown in FIG. 8A. On the other hand, when the holding-power-OFF-setting is set, the power is not supplied to the focus driver 306 while the focus lens 304 stands by at its stop position after it is driven, as shown in FIG. 8B. Specifically, the power is supplied only when the focus lens 304 is driven.

Figure 9:
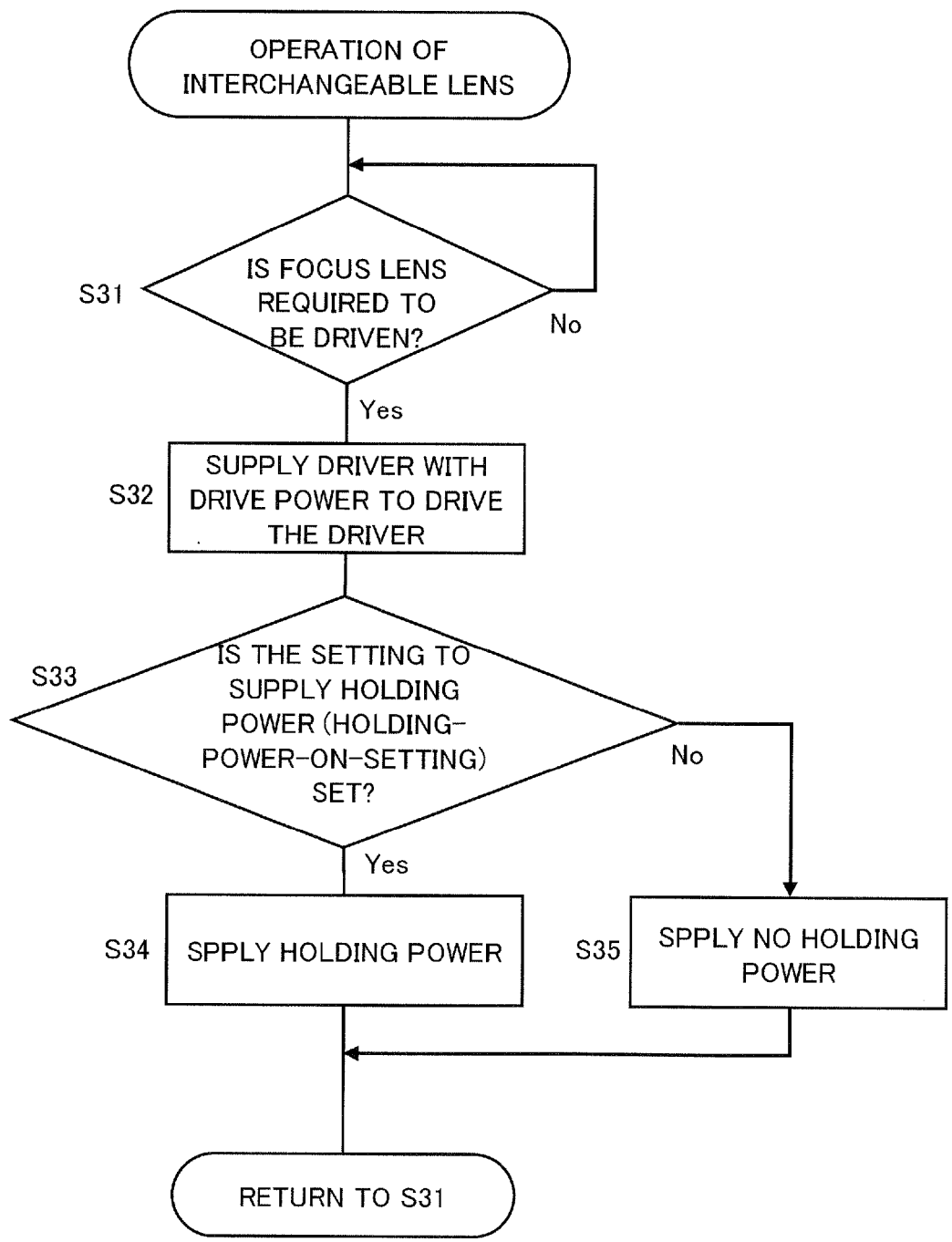
FIG. 9 is a flowchart for explaining an example of an operation of the interchangeable lens in the embodiment.

The operation when the holding-power-ON-setting or the holding-power-OFF-setting is set will be described with reference to the flowchart shown in FIG. 9.

Firstly, the lens controller 311 determines whether the focus lens 304 needs to be driven or not (S31). The case in which the focus lens needs to be driven is, for example, a case in which a zoom tracking is required in the interchangeable lens 3, or a case in which the focus lens 304 needs to be driven according to the control signal from the camera body 2.

When determining that the focus lens 304 needs to be driven, the lens controller 311 supplies driving power to the focus driver 306 so as to drive the focus lens 304 (S32). The driving power may be supplied continuously following the holding power while the holding power is supplied. Although the driving power and the holding power are distinctively described for clarifying the description, it is unnecessary to distinguish them.

After the driving of the focus driver 306 is completed, the lens controller 311 determines whether the holding-power-ON-setting is set (S33). When the holding-power-ON-setting is set, the lens controller 311 supplies the holding power to the focus driver 306 (S34). The supply of the holding power allows the focus driver 306 to stop the focus lens 304 at the desired position. On the other hand, when the holding-power-OFF-setting is set, the lens controller 311 does not supply the holding power to the focus driver 306 (S35). When the holding power is not supplied, the focus driver 306 might stop the focus lens 304 at the position shifted from the desired position.

When a series of processes described above is completed, the lens controller 311 returns to step S31 to perform the same processes subsequently.

Figure 10:
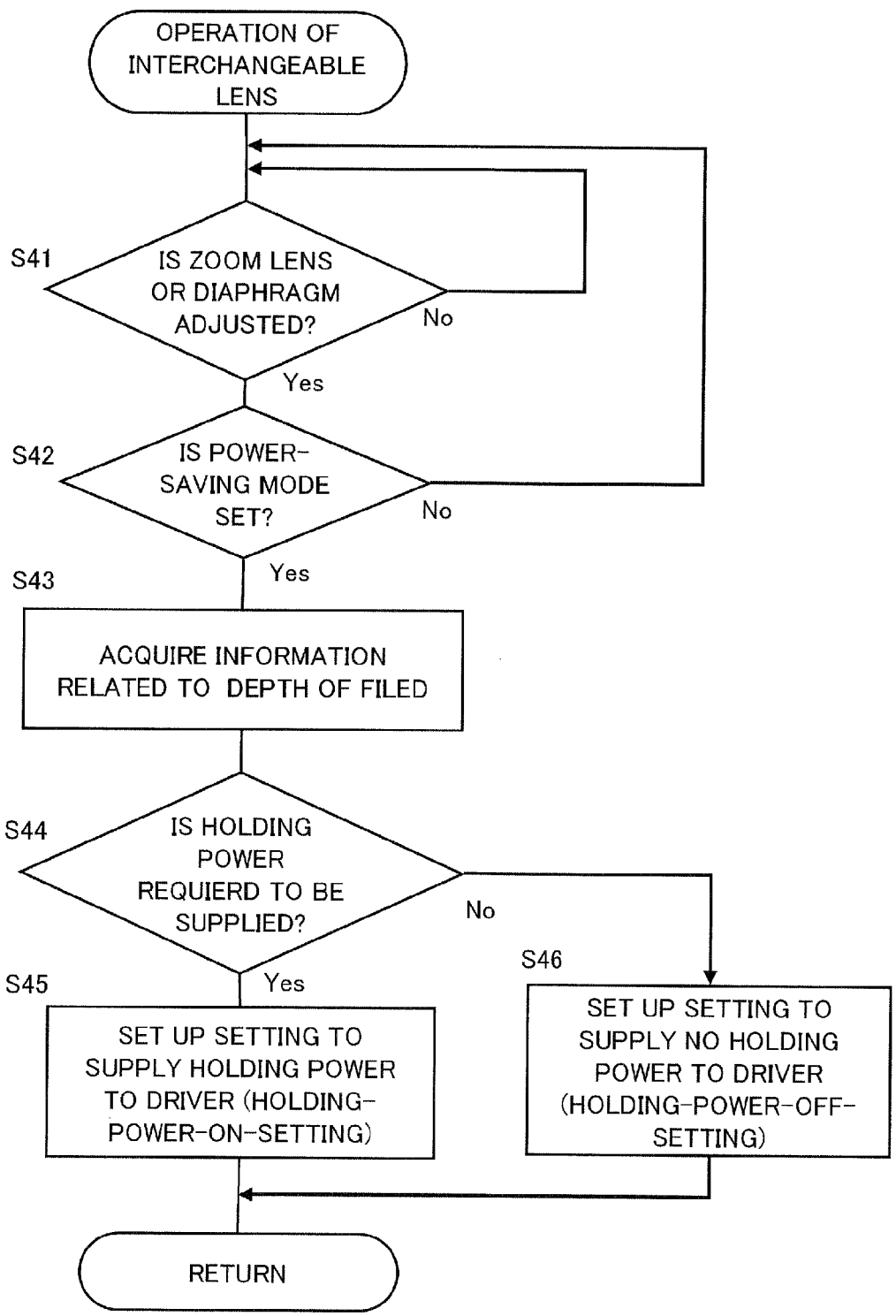
FIG. 10 is a flowchart for explaining an example of an operation of the interchangeable lens in the embodiment.

When the zoom lens 303 or the diaphragm 307 is driven in the camera system 1, the depth of field of the optical system is changed. In this case, it is preferable that the operation shown in the flowchart in FIG. 10 is performed in the interchangeable lens 3 considering the depth of field.

When detecting that the zoom lens 303 or the diaphragm 307 is adjusted (S41), the lens controller 311 reads the setting information stored in the buffer memory 312 and determines whether the power-saving mode is set (S42). When determining that the power-saving mode is set, the lens controller 311 performs the process at step S43. When determining that the power-saving mode is not set, the lens controller 311 returns to the process at step S41.

At step S43, the lens controller 311 acquires, as the information relating to the depth of field, the information relating to the zoom position based on the information outputted from the zoom lens position detector 313 and the AV (aperture value) based on the information outputted from the diaphragm driver 308. These pieces of the acquired information are based on the information outputted after the zoom lens 303 or the diaphragm driver 308 is adjusted. The lens controller 311 then refers to the table information in FIG. 5 based on the zoom position and the AV (depth of field) to determine whether it is necessary to supply the holding power (S44). When determining that it is necessary to supply the holding power, the lens controller 311 sets up a setting (holding-power-ON-setting) for operation to supply the holding power to the focus driver 306 (S45). On the other hand, when determining that no holding power is supplied, the lens controller 311 sets up a setting (holding-power-OFF-setting) for operation to supply no holding power to the focus driver 306 (S46).

According to the configuration described above, the interchangeable lens 3 itself can determine whether it is necessary to supply the holding power. Therefore, the camera body 2 can reduce power consumption in the interchangeable lens 3 while keeping the focused state to the subject only by sending the information relating to the power-saving mode.

4. Conclusion

The digital camera 1 includes the camera body 2 and the interchangeable lens 3 that is mountable to the camera body 2. The camera body 2 includes the CPU 211 sending the instruction to the interchangeable lens 3. The interchangeable lens 3 includes the optical system having the focus lens 304, the focus driver 306 that drives the focus lens 304, the lens controller 311 that can set the lens to the power-saving mode according to the instruction from the camera body 2, the lens controller 311 that determines whether the holding power for allowing the focus lens 304 to stop and stand by is supplied to the focus driver 306 according to the information relating to the depth of field of the optical system when the power-saving mode is set by the lens controller 311 and the focus lens 304 is controlled to stop and stand by, and the lens controller 311 that supplies the holding power to the focus driver 306 according to the result of the determination of itself.

According to the configuration, when the power-saving mode is set and the focus lens is held at the stop position, it can be determined according to the depth of field whether the holding power is supplied to the focus driver. Accordingly, it is controlled such that, when the depth of field is shallow, the holding power is supplied to the focus driver, while the holding power is not supplied to the focus driver when the depth of field is deep. Accordingly, when the depth of field is shallow, the priority is given to keep the focused state to the subject so that the deterioration in the image quality can be prevented. On the other hand, when the depth of field is deep, the priority is given to the reduction in power consumption so that power-saving is achieved.

Other Embodiments

The first embodiment has been described above. However, an embodiment is not limited to the above-mentioned embodiment, and can be realized by other embodiments. The other embodiments will be described collectively as follows.

In the above-mentioned embodiment, the imaging device is made of a CMOS sensor. However, the imaging device is not limited thereto. For example, the imaging device may be made of a CCD image sensor. Specifically, the imaging device can take any configurations so long as it captures a subject image to generate image data (digital signal or electric signal). When the imaging device is made of the CMOS sensor, power consumption can be reduced.

The CPU 211 in the above-mentioned embodiment determines whether it is necessary to set the interchangeable lens 3 to the power-saving mode, according to the control mode set to the camera body 2. However, the embodiment is not limited thereto. It may also be determined whether it is necessary to set the interchangeable lens 3 to the power-saving mode considering the control state (operation state) of the camera body 2. For example, when the mode selected by the mode switching dial 221 is the still image shooting mode, the CPU 211 may determine whether it is necessary to set the interchangeable lens 3 to the power-saving mode, according to whether the shutter switch 212 is kept to be half-pressed (see FIG. 3B). When the shutter switch 212 is kept to be half-pressed, the CPU 211 determines that it is unnecessary to set the interchangeable lens 3 to the power-saving mode. This is because, when the shutter switch 212 is half-pressed in the still image shooting mode, the digital camera 1 starts preparation for starting the shooting. Specifically, in the preparation for starting the shooting, automatic focus control is generally performed and thus high precision of the stop position of the focus lens is required. When the shutter switch 212 is not half-pressed, the CPU 211 determines that the interchangeable lens 3 needs to be set to the power-saving mode. This allows the power consumption to be reduced.

Figure 11:
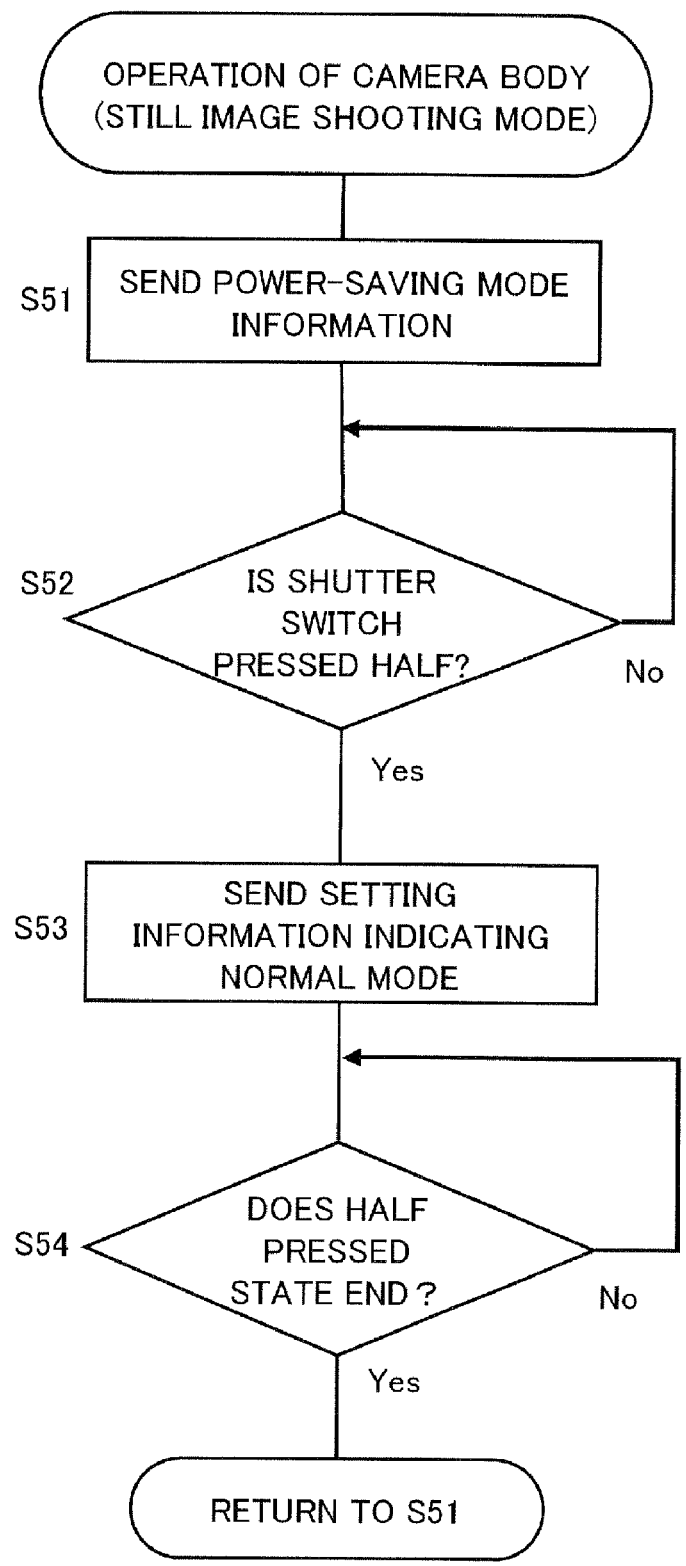
FIG. 11 is a flowchart for explaining an example of an operation of a camera body in another embodiment.

The specific operation of the camera body 2 will be described with reference to the flowchart shown in FIG. 11. When the still image shooting mode is set, the CPU 211 sends the setting information indicating the power-saving mode to the lens controller 311 (S51). Thereafter, the CPU 211 determines whether the shutter switch 212 is half-pressed (S52). When the shutter switch 212 is half-pressed, the CPU 211 sends the setting information indicating the normal mode to the lens controller 311 (S53). Then, the CPU 211 determines whether the half-pressed state of the shutter switch 212 is released (S54). When determining that the half-press state of the shutter switch 212 is released, the CPU 211 returns to step S51 to perform the same process described above.

In the above-mentioned embodiment, with reference to the table information shown in FIG. 5, the depth of field is evaluated based on the zoom position and the AV to determine whether the holding power is supplied. However, an embodiment is not limited thereto. The information indicating the depth of field may be calculated based on the focal distance and a diaphragm value (aperture value) of the diaphragm according to the position of the zoom lens, and whether the holding power is supplied may be determined according to the calculated information. Either one of the zoom position and the AV may be used as the information relating to the depth of field.

The embodiment described above is explained by using the information relating to the zoom position corresponding to the focal distance and the AV corresponding to the diaphragm value, as the information relating to the depth of field. However, the embodiment is not limited thereto. Information relating to a focus position that is in focus by the focus lens or a diameter of the least circle of confusion (permissible circle of confusion), and so on may be considered as the information relating to the depth of field.

In the embodiment described above, the driving unit is made of the focus driver 306 including a stepping motor and a driver thereof. However, the embodiment is not limited thereto. The driving unit may have any configurations so long as it allows the focus lens to stop and stand by at the position having different precision between the case in which the holding power is supplied and the case in which no holding power is supplied. Therefore, a servomotor, a synchronous motor or the like can be used as the driving unit.

Specifically, the embodiment is not limited to the first embodiment described above, but can be achieved in various configurations.

INDUSTRIAL APPLICABILITY

The embodiments described above are applicable to a digital still camera, a digital video camera or the like. The embodiments described above are also applicable to a camera system including a camera body and an interchangeable lens.

The specific embodiments have been described. However, it should be understood by those skilled in the art that various modifications, alterations, and other applications are possible. Accordingly, the possible embodiment is not limited to the specific disclosure here, but can be limited only by the scope of the appended claims. The present application is related to Japanese Patent Application No. 2008-157757 (filed on Jun. 17, 2008) and U.S. Provisional Patent Application No. 61/053,815 (filed on May 16, 2008), the entire contents of which are incorporated herein by reference.

What is claimed is:
1. An imaging apparatus comprising:
an optical system including a focus lens;
a driver configured to drive the focus lens;
a controller configured to control a supply of power to the driver; and
a setting unit configured to set a power supply mode for specifying a method of supplying power to the driver, wherein
when a predetermined power supply mode is set, the controller determines according to a magnitude of a depth of field of the optical system whether a holding power for holding a state of the focus lens is supplied to the driver when the focus lens is stopped, and controls the supply of the holding power to the driver according to a result of the determination.

2. The imaging apparatus according to claim 1, wherein the driver has different precisions in position for holding the focus lens between the case in which the holding power is supplied and the case in which no holding power is supplied.

3. The imaging apparatus according to claim 2, wherein the driver keeps holding the focus lens at a stop position at which the focus lens is stopped when the holding power is supplied, and holds the focus lens at a position within a predetermined range from the stop position when no holding power is supplied.

4. The imaging apparatus according to claim 1, wherein the controller performs the control so as to supply the holding power to the driver when the focus lens is stopped, in a power supply mode other than the predetermined power supply mode.

5. The imaging apparatus according to claim 1, wherein the optical system further includes a zoom lens, the interchangeable lens further includes a diaphragm, and the magnitude of the depth of field is determined according to the position of the zoom lens and/or the opening state of the diaphragm.

6. The imaging apparatus according to claim 1, wherein the predetermined power supply mode is a mode in which power consumption is more reduced than that in a power supply mode other than the predetermined power supply mode.

7. The imaging apparatus according to claim 1, wherein the setting unit sets a power supply mode to the predetermined power supply mode, when the imaging apparatus captures a moving image or reproduces an image.

8. A camera system comprising an interchangeable lens and a camera body,
the camera body comprising:
a power supplying unit configured to supply power to the interchangeable lens;
a setting unit configured to set a power supply mode for specifying a method of supplying power; and
a sending unit configured to send setting information indicating the set power supply mode to the interchangeable lens,
the interchangeable lens comprising:
an optical system including a focus lens;
a driver configured to drive the focus lens with the power supplied by the power supplying unit; and
a controller configured to control the supply of power to the driver, wherein
when a predetermined power supply mode is set according to the setting information sent from the camera body, the controller determines according to a magnitude of a depth of field of the optical system whether a holding power for holding a state of the focus lens is supplied to the driver when the focus lens is stopped, and controls the supply of the holding power to the driver according to a result of the determination.

9. The camera system according to claim 8, wherein the camera body can set a plurality of control modes relating to image recording and image playback, and
the setting unit temporarily changes the power supply mode according to the set control mode and the control state of the camera body.

10. An interchangeable lens mountable to a camera body comprising:
an optical system including a focus lens;
a driver configured to drive the focus lens with power received from the camera body;
a controller configured to control the supply of power to the driver; and
a setting unit configured to set a power supply mode for specifying a method of supplying power to the driver under a control of the camera body, wherein
when a predetermined power supply mode is set according to setting information sent from the camera body, the controller determines according to a magnitude of a depth of field of the optical system whether a holding power for holding a state of the focus lens is supplied to the driver when the focus lens is stopped, and controls the supply of the holding power to the driver according to a result of the determination.

* * * * *